United States Patent
Koster et al.

(10) Patent No.: US 8,843,741 B2
(45) Date of Patent: Sep. 23, 2014

(54) SYSTEM AND METHOD FOR PROVIDING A CERTIFICATE FOR NETWORK ACCESS

(71) Applicants: Kevin Lee Koster, Westminster, CO (US); Roger Lynn Haney, Denver, CO (US); Christopher Lyle Hessing, West Jordan, UT (US)

(72) Inventors: Kevin Lee Koster, Westminster, CO (US); Roger Lynn Haney, Denver, CO (US); Christopher Lyle Hessing, West Jordan, UT (US)

(73) Assignee: Cloudpath Networks, Inc., Westminster, CO (US)

( * ) Notice: Subject to any disclaimer, the term of this patent is extended or adjusted under 35 U.S.C. 154(b) by 0 days.

(21) Appl. No.: 13/662,224

(22) Filed: Oct. 26, 2012

(65) Prior Publication Data
US 2014/0122869 A1 May 1, 2014

(51) Int. Cl.
*H04L 9/32* (2006.01)

(52) U.S. Cl.
USPC .......................................................... 713/156

(58) Field of Classification Search
CPC ............ H04L 29/06775; H04L 9/3268; H04L 63/0823; H04L 9/3228; H04L 63/08; H04L 63/0815; H04L 9/3212; H04L 12/2416; H04L 12/2497; H04L 12/417; G06F 21/33
USPC .......................................................... 713/156
See application file for complete search history.

(56) References Cited

U.S. PATENT DOCUMENTS

| | | | |
|---|---|---|---|
| 6,934,533 B2 * | 8/2005 | Joyce et al. ................ | 455/414.1 |
| 6,978,364 B1 | 12/2005 | Balaz et al. | |
| 7,069,440 B2 * | 6/2006 | Aull ............................... | 713/175 |
| 7,249,375 B2 | 7/2007 | Bhatia et al. | |
| 7,428,750 B1 * | 9/2008 | Dunn et al. ....................... | 726/8 |
| 7,451,305 B1 | 11/2008 | Pritikin | |
| 7,743,246 B2 | 6/2010 | Pritikin | |
| 7,748,035 B2 | 6/2010 | Nedeltchev et al. | |
| 7,788,493 B2 | 8/2010 | Mononen et al. | |
| 7,913,298 B2 | 3/2011 | Bhatia et al. | |
| 7,953,979 B2 | 5/2011 | Borneman et al. | |
| 8,064,480 B2 | 11/2011 | Bitter et al. | |
| 2002/0144119 A1 | 10/2002 | Benantar | |
| 2006/0036858 A1 * | 2/2006 | Miura et al. ................... | 713/170 |
| 2006/0094403 A1 * | 5/2006 | Norefors et al. .............. | 455/411 |
| 2007/0204148 A1 * | 8/2007 | Sakamura et al. ............ | 713/156 |
| 2008/0072301 A1 | 3/2008 | Chia et al. | |
| 2008/0263629 A1 | 10/2008 | Anderson | |
| 2009/0217048 A1 * | 8/2009 | Smith ........................... | 713/176 |

(Continued)

OTHER PUBLICATIONS

Hamdane, B. et al., "Using the HMAC-Based One-Time Password Algorithm for TLS Authentication", 2011, IEEE, p. 1-8.*

(Continued)

*Primary Examiner* — Eleni Shiferaw
*Assistant Examiner* — Demaris Brown
(74) *Attorney, Agent, or Firm* — Daniel W. Roberts; Law Offices of Daniel W. Roberts, LLC (57) ABSTRACT

Provided is a system and method for providing a certificate, and more specifically a certificate for network access upon a second system. The method includes receiving from a user a request made with a first device for network access, the request including a voucher. At least one characteristic of the first device is also determined. Upon verification of the voucher and in response to the first device having at least one characteristic corresponding to at least one predefined device criteria, the user is provided with a certificate with at least one characteristic for network access. An associated system for providing a Certificate is also provided.

60 Claims, 4 Drawing Sheets

(56) References Cited

U.S. PATENT DOCUMENTS

| | | | | |
|---|---|---|---|---|
| 2009/0274303 | A1* | 11/2009 | Popp | 380/273 |
| 2010/0070760 | A1* | 3/2010 | Vanderveen et al. | 713/156 |
| 2010/0077208 | A1* | 3/2010 | Appiah et al. | 713/158 |
| 2010/0154046 | A1* | 6/2010 | Liu et al. | 726/8 |
| 2011/0185181 | A1* | 7/2011 | Lin | 713/176 |
| 2011/0247055 | A1* | 10/2011 | Guo et al. | 726/4 |
| 2011/0283103 | A1* | 11/2011 | Eyal et al. | 713/156 |
| 2013/0081111 | A1* | 3/2013 | Geller | 726/4 |

OTHER PUBLICATIONS

Jeong et al., "Integrated OTP-Based User Authentication Scheme Using Smart Cards in Home Networks", 2007, IEEE, p. 1-7.*

Chadwick, David, "FileSpace an Alternative to CardSpace that Supports Multiple Token Authorisation and Portability Between Devices", Apr. 2009, ACM, p. 94-102.*

Lim et al., "Secure and Flexible Certficate Access in the WS-Sercurity through LDAP Component Matching", Oct. 2004, ACM, p. 87-96.*

* cited by examiner

SYSTEM AND METHOD FOR PROVIDING A CERTIFICATE FOR NETWORK ACCESS

FIELD OF THE INVENTION

The present invention relates generally to systems and methods for establishing authentication of users of computer networks, and more specifically to systems and methods for issuing digital certificates to users of secured networks, the certificates identifying the users and also controlling, at least in part, the scope of network access afforded to the user.

BACKGROUND

In the physical world, individual persons are able to assess one another by sight, hearing and an accounting of physical attributes. Drivers' licenses, passports and other regulated documents provide verified accountings of attributes that permit individuals to validate who they are, or for others to validate who an individual says he or she is.

Fingerprints, retinal pattern, breath and DNA among other attributes are understood and recognized to be highly individualistic and are widely accepted and used to verify identity. But these attributes are physical and tied to a physical world.

Computers have become commonplace and highly integrated in nearly all aspects of modern life—transcending the bounds of professional and social spaces, computers are a prominent fixture in the workplace, in the home, as mobile devices and in many other places and arenas of daily life and modern existence.

Increasingly individuals are representing themselves in the cyber world of computer systems and computer networks, where digital information in the elemental form of binary data is entirely ignorant of physicality. A critical problem in cyberspace is knowing with whom you are dealing—in short, at the present time there is no precise way to determine the identity of a person in digital space. Friends, families, colleagues may use a common computer, share passwords, or even pretend to be people they are not. Sometimes these actions are benign—sometimes they are not.

As computers are often used in a commercial setting such as a business, organization or secured network (hereinafter "business"), there are often very legitimate desires by that business to know who is accessing their network. In addition, in many instances it is highly desired by a business or organization to not only know who is using their system, but also to control the type of equipment that is used with their system.

For example, to comply with licensing, privacy or other external or internal regulation, a company may desire for it's users to make use of provided equipment for conducting company business. In other words a new or existing employee is provided with a company system that may have customized software for word processing, email, network access etc. . . . .

In addition, in some instances the different levels of employees may impose different requirements—i.e., a secretary may have email access to the multiple accounts for the persons he or she supports, a vice president or president may have access rights to an entire team, and a mail room person may have access to email and a company directory, but no file access.

Typically, companies permit varying granularity of configuration by individualized configuration—i.e., the system for a given employee must be either pre-configured and given the employee, or the employee must go to the tech resources group and receive his or her new machine.

In addition, in many instances companies or other entities make use of user identities, passwords and even digital certificates in an effort to gate control who has access to what, when, and perhaps from where.

Digital certificates, also known as public key certificates, are electronic documents that bind a digital signature (a mathematical schema for demonstrating authenticity) to a key, such as a public key, that is tied to an identity. A public key infrastructure (PKI) is a set of hardware, software, people, policies and/or procedures used to create, manage, distribute, use, store and revoke digital certificates.

When referring to or working with digital certificates, in many cases a PKI is implied. More simply put, digital certificates are electronic documents that are offered to prove or verify the identity of user. Typically a digital certificate is issued by a certificate authority (CA) that has performed or established some threshold of information to assert that the party to whom the certificate is issued is indeed the party he or she reports to be. For a business or organization, the PKI is typically itself, or a third party entity that has been charged with providing digital certificates to the employees.

In addition to identifying a person, a digital certificate may also include additional information, which may be used to determine the level of authorization that should be afforded to the holder of the digital certificate. Examples include the duration of validity for the certificate, the user's real name, the user's alternative name, the intermediate certificate authority who issued the certificate, the type of computer system used when requesting the certificate, the type of computer system authorized for use with the certificate, or other such information pertinent to establishing both the identity of the user of the digital certificate as well as the veracity of the root certificate authority ultimately responsible for the apparent authority vested in the digital certificate.

Indeed, digital certificates can and often do provide a great deal of simplicity in authenticating a user as the user has clearly established himself or herself in some way that is sufficient for a certificate authority to provide the digital certificate. Relying on a digital certificate can ease a network's reliance on parties having previously established or contemporaneously establishing a local identity—a savings both in terms of time for the user and costs associated with the overhead and storage of the user identity for the local network.

But understanding who is who can still be a difficult prospect. Often an employee has his or her own private computer system, if not his or her own smart phone, computer tablet or other computing device. In many cases these devices may be quite similar to the systems that the company intends to provide.

It thus becomes a challenge for the company to ensure that employees use proper systems for access and conducting company business, and that employees do not share or attempt to share their digital identifications with multiple systems. In other words, if a company provides a digital certificate for network access intended for use by the employee with his or her laptop, the company may have desire that the employee not use this same digital certificate for his or her smart phone, laptop or tablet for network access as well.

Hence there is a need for a method and system that is capable of overcoming one or more of the above identified challenges.

SUMMARY OF THE INVENTION

Our invention solves the problems of the prior art by providing novel systems and methods for providing a certificate.

In particular, and by way of example only, according to one embodiment of the present invention, provided is a method of providing a certificate for network access including: receiving from a user authenticated to a first system a request made with a first device for network access, the request including a voucher; determining at least one characteristic of the first device; and upon verification of the voucher and in response to the first device having at least one characteristic corresponding to at least one predefined device criteria, providing the user with a certificate with at least one characteristic for network access.

In yet another embodiment, provided is a method of providing a certificate for network access including: initializing a voucher and specifying at least one device criteria for receiving a certificate; providing the voucher to a user; receiving a request for network access from a user having a first device; determining at least one characteristic of the first device; and in response to the first device having a characteristic corresponding to the specified device criteria, permitting the user to provide the voucher, and upon verification of the voucher providing the user with a certificate with at least one characteristic for network access by the first device.

For another embodiment, provided is a non-transitory machine readable medium on which is stored a computer program for providing a certificate for network access, the computer program comprising instructions which when executed by a computer system having at least one processor performs the steps of: receiving from a user authenticated to a first system a request made with a first device for network access, the request including a voucher; determining at least one characteristic of the first device; and upon verification of the voucher and in response to the first device having at least one characteristic corresponding to at least one predefined device criteria, providing the user with a certificate with at least one characteristic for network access.

Further, in yet another embodiment provided is a non-transitory machine readable medium on which is stored a computer program comprising instructions to adapt a computer system having at least one processor to provide a certificate for network access, the computer program comprising: an input routine operatively associated with an input device for receiving from a user a request made with a first device for network access, the request including a voucher; a verifying routine for verifying at least one characteristic of the first device as corresponding to at least one predefined device criteria and verifying the voucher; and an output routine for providing the user with a certificate with at least one characteristic in response to verification of the voucher and the first device having at least one device criteria Still, in yet another embodiment, provided is a system for providing a certificate for network access including: a first system structured and arranged as a single sign on system having a plurality of user accounts; an authorizing system structured and arranged to receive from a user of the first system a request made with a first device for network access, the request including a voucher, the authorizing system further structured and arranged to determine at least one characteristic of the first device and upon verification of the voucher and in response to the first device having at least one characteristic corresponding to at least one predefined device criteria, providing the user with a certificate with at least one characteristic for network access.

DETAILED DESCRIPTION

Before proceeding with the detailed description, it is to be appreciated that the present teaching is by way of example only, not by limitation. The concepts herein are not limited to use or application with a specific system or method for providing a certificate, and more specifically a certificate for network access. Thus although the instrumentalities described herein are for the convenience of explanation shown and described with respect to exemplary embodiments, it will be understood and appreciated that the principles herein may be applied equally in other types of systems and methods involving providing a certificate.

This invention is described with respect to preferred embodiments in the following description with reference to the Figures, in which like numbers represent the same or similar elements. Further, with the respect to the numbering of the same or similar elements, it will be appreciated that the leading values identify the Figure in which the element is first identified and described, e.g., element 100 appears in FIG. 1.

To further assist in the following description, the following defined terms are provided.

"First System"—a web service or social networking site such as Facebook, YouTube, Google Apps, etc. . . . . The First System may be a federated system in that it is comprised of a collection of systems and applications that are operating in harmony and typically as a single sign on (SSO) system.

"Second System"—the network or application resource to which a User may connect or engage based on the user having an appropriate Certificate.

"Authorizing System"—the entity that, in response to a request to generate a certificate to permit network access polls the First System for Users having at least one pre-defined attribute that has been established as the basis for granting the certificate.

"First Device/Second Device"—the computing device that is used by the person requesting a certificate. As is further set forth below, it is an aspect of the present invention to validate the device as proper in determining whether or not to provide the requesting person with a Certificate.

"Device Characteristic"—a physical aspect of the device and/or a software aspect of the device which is an identifiable element of the device, such as, but not limited to, device ID number, device serial number, device type, manufacturer, software version, software ID, an application, digital ID, or other similar element. It may also be the presence of or perhaps the absence of a discrete file, and/or the response to a private key or public key challenge. Typically it is provided as a component of the request for the Certificate, directly or as perhaps metadata, but it also may be determined by querying the requesting device.

"Device Criteria"—at least one predetermined Device Characteristic, which if correlated with a requesting device is at least a partial basis for granting a requested Certificate.

"User"—typically a person or at the very least a device used by a person who is known to the First System in the sense that the he or she has established a User account with the First System by providing a threshold of data, e.g. attributes, to identify themselves. Typically it is expected that the Users interactions with the First System will also serve to establish additional Attributes about themselves. For at least one embodiment, the Users have pages or accounts which may be viewed by other Users and or applications.

"Certificate"—also referred to as a digital certificate, this is a credential that is usable for authentication to the Second System. In at least one embodiment, the Certificate is an X.509 digital certificate.

"Certificate Characteristic"—elements of data that are encoded into or associated with the Certificate. Certificate Characteristics may include but are not limited to, a root certificate authority, intermediate certificate authority, time period, common name, subject name, subject's alternative name.

Figure 1:
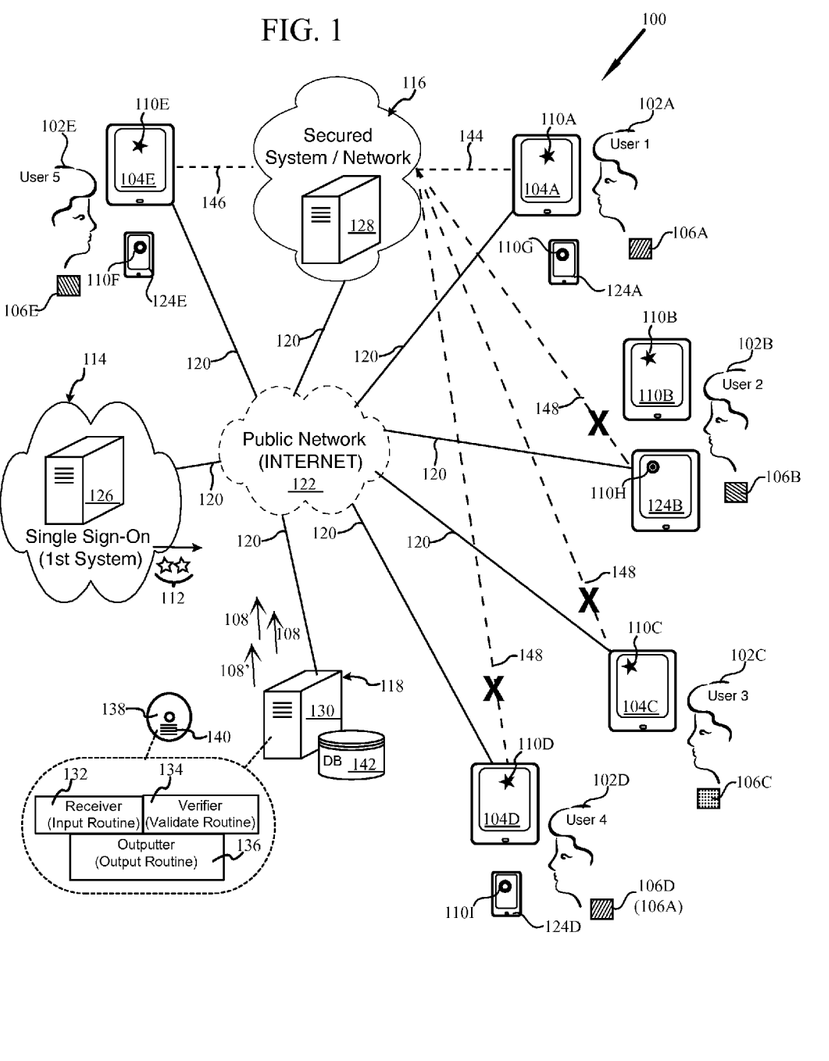
FIG. 1 illustrates a high level diagram of a system for providing a certificate for network access to users having a first device having at least one characteristic corresponding to a predefined device criteria and a voucher in accordance with at least one embodiment.

Turning now to the figures, and more specifically, FIG. 1, there is shown a high level diagram of an embodiment of a System for Providing a Certificate, e.g., SPC 100, for network access to Users 102 having at least a First Device 104 and a Voucher 106. More specifically, and as is described below, in accordance with at least one embodiment, Users 102 may obtain a Certificate 108 if they have both a First Device 104 having a Characteristic 110 corresponding to at least one predefined Device Criteria 112 and a valid Voucher 106.

In addition, as is shown in FIG. 1, in general there is a First System 114 that receives the request from the User 102, and there is a Second System 116 to which the network access is granted. As suggested by the illustration of FIG. 1, the First System 114 and the Second System 116 may indeed be separate systems. However, it should also be appreciated that the First System 114 and the Second System 116 may both be varying parts of a greater whole—such as a company, business, or other entity that provides the First System 114 as a way to authenticate it's Users 102, and the Second System 116 is the private network to which the authenticated Users 102 are then given network access.

As used herein, the term "network access" is understood and appreciated to be the ability of a User 102 to make use of the resources of Second System 116. This may include for example, but is not limited to, the use of applications, access to data, and connectivity to other systems and Users 102 within the Second System 116 as well as other public and private systems.

More specifically, in FIG. 1 there are shown a plurality of Users 102, of which Users 102A~102E are exemplary. The Authorizing System 118, First system 114 and Second System 116 are also shown, and for the case of the present example, each of these entities is shown to have a communication link 120 to a public network 122, such as the Internet.

In varying embodiments, one or more of the elements of SPC 100 may be directly connected to one another, if not integrated with each other, but it is understood and appreciated that in most instances the incorporation of the Internet 122 as a common means of communication and information exchange is within the scope of the present invention.

It is also to be understood and appreciated that the elements of the SPC 100 need not maintain continual communication links 120. In other words, Users 102 may log on or off the First System 114, the Second System 116 may be on or off line at different times for different reasons, and the Authorizing System 118 may be on or off line at different times and for different reasons.

The First System 114 is shown to be a single sign on system, such as a system typically employed to verify a User's name and password for a company. Of course it should also be understood and appreciated that the First System 114 in varying embodiments may also be a Social Network or other system to which Users have established, or perhaps not yet established, a known identity with a username and password.

For at least one embodiment, each of the plurality of Users 102A-102E is known to the First System 114 and each of the users has at least a First Device 104, of which First Devices 104A-104E are exemplary. Each User 102A-102E also is shown to have a Voucher 106, of which Vouchers 106A~106E are exemplary. Users 102A, 102B, 102D and 102E are also shown to each have a Second Device 124, and more specifically Second Device 124A for User 102A, Second Device 124B for User 102B, Second Device 124D for User 102D, and Second Device 124E for User 102E.

As has been shown pictorially, First Devices 104A-104E are suggested to be tablet computing devices and Second Device 124A and 124E are suggested to be smart phones. Second Device 124B is also suggested to be a tablet device, but may be of a different type. In addition, each device has at least one Characteristic 110, of which Characteristics 110A-110I are exemplary.

As noted above in the listing of definitions, in varying embodiments the Characteristic 110 is understood and appreciated to be a physical aspect of the device and/or a software aspect of the device. More specifically, the Characteristic 110 is an identifiable element of the device, such as, but not limited to, device ID number, device serial number, device type, manufacturer, software version, software ID, an application, digital ID, MAC address, or other similar element that may be used to identify a class of devices, if not uniquely identify one device from another. Moreover, in at least one embodiment the Characteristic 110 is intended to be unique to each device, such as a device ID number or serial number. For yet another embodiment, the Characteristic 110 is not specifically unique to only one device, but rather serves to identify a class or type of device, i.e., an iPad® 2, an iPad® 3, or an iPhone® 5. In addition, in general the at least one Characteristic 110 is also something that is not easily duplicated from one device to another.

With respect to each device, whether a First Device 104 or a Second Device 124, it is understood and appreciated that each is a computing device including microprocessors, memory and the like which are adapted by hardware or software to permit data exchange over a network, and more specifically browser based data exchange. For at least the First Devices 104, each is further adapted to employ the use of at least one Digital Certificate to establish a secure option for data exchange with the Second System 116.

As shown in FIG. 1, the First System 114 is established by at least one computer system 126 (including microprocessors, memory, and the like) adapted at least in part to provide the First System 114. Likewise the Second System 116 is also established by at least one computer system 128 (including microprocessors, memory, and the like) adapted at least in part to provide the Second System 116.

Similarly, the Authorizing System 118 is also provided by at least one computer system 130 (including microprocessors, memory, and the like) adapted at least in part to provide the Authorizing System 118. To facilitate this adaptation, in at least one embodiment the Authorizing System 118 has a receiver 132, a verifier 134 and an outputter 136.

The receiver 132 is structured and arranged to receive information regarding a requests for Certificates. More specifically, for at least one embodiment the receiver 132 receives the predefined Device Criteria 112. This predefined Device Criteria 112 may be provided by the First System 114, Second System 116 or other third party.

The receiver 132 also receives a request from a User 102 using a First Device 104 to make the request. This request also includes a Voucher 106. In addition, as for at least one embodiment the Request is made by way of a web browser connection between the First Device 104 and the Authenticating System 130, the request includes a browser agent string which identifies the type of web browser being used which may in turn indicate the type of First Device 104 being used.

The verifier 134 is structured and arranged to verify the Voucher 106. Moreover, in varying embodiments the Voucher 106 is a one time password or token, is valid within a predefined date range, and or is associated to at least one User 102 or perhaps a group consisting of a type of User 102, e.g., secretaries, managers, field reps, etc. . . . .

In addition, the verifier 134 is also structured and arranged to verify at least one Characteristic 110 of the First Device 104 as corresponding to at least one predefined Device Criteria 112. In at least one embodiment, this verification of a Characteristic 110 is performed at least in part by reviewing metadata provided in the request.

For example, in at least one embodiment the User 102 making the request does so with a First Device 104 by way of a web browser using Hypertext Transfer Protocol (aka HTTP). The HTTP identifies the client software originating the request using a user-agent header that may identify the application type, operating system, software vendor, software version as well as additional information about the First System 114 in use.

For yet another embodiment, the verifier 134 may be further structured and arranged to query the requesting device for a specific Characteristic 110. This Characteristic 110 may be, but is not limited to, a report of a serial number, a software ID, digital ID, the presence or absence of a specific file, the ability to respond to a hash code, public key or private key query, or other similar element that may be provided by the device so as to identify itself as a First Device 104.

The outputter 136 is structured and arranged to provide a User 102 with a Certificate 108 having at least one characteristic for network access on the Second System 116. More specifically, the outputter 136 provides Certificates to Users 102 who have both a valid Voucher 106 and a First Device 104 having at least one Characteristic 110 corresponding to at least one predefined Device Criteria 112. For at least one embodiment, the provided Certificates 108 are generally the same with respect to the scope of access permitted—though each of course may include sufficient specific information for the User 102 of the Certificate to be specifically identified.

It is also to be understood and appreciated, that the Authorizing System 118 may provide Certificates 108 permitting different network access based on the Users 102 having different Vouchers 106 and or different types of First Systems 104, each having potentially different Characteristics 110. For example, if User 102A is taken to be a manager, he or she may be provided certificate 108', whereas a User 102E being support staff is provided with certificate 108—Certificate 108' providing greater access then Certificate 108.

With respect to SPC 100, it is understood and appreciated that in varying embodiments the elements, e.g., the receiver 132, the verifier 134 and the outputter 136 may be provided as software routines, hardware elements and/or combinations thereof.

The elements of SPC 100, e.g., the receiver 132, the verifier 134 and the outputter 136 have also been illustrated distinctly for ease of illustration and discussion. In varying embodiments of course it is understood and appreciated that one or more of these elements may be combined and/or further subdivided into a number of sub-elements.

With respect to FIG. 1, the elements of the receiver 132, the verifier 134 and the outputter 136 are conceptually illustrated in the context of an embodiment for a computer program. Such a computer program can be provided upon a non-transitory computer readable media, such as optical disc 138, having encoded thereto an embodiment of a program for providing a Certificate 108 for network access as computer executable instructions 140.

The computer executable instructions 140 are provided to computer 130. During operation, the program for providing a certificate 108 for network access may be maintained in active memory for enhanced speed and efficiency. In addition, the program for providing a Certificate 108 for network access may also be operated within a computer network and may utilize distributed resources.

In addition, for at least one embodiment, the Authorizing System 118 is provided with a database 142. In varying embodiments, the database 142 may be a component integrated with the Authorizing System 118, or a remote database to which the Authorizing System 118 has access rights when and as needed. Moreover, the database 142 provides correlated records regarding the Vouchers 106, the Users 102 and the First Devices 104.

Again, it is to be understood and appreciated that SPC 100 advantageously provides Certificates 108 based on at least two factors, the User 102 having a Voucher 106 and the User 102 having a proper First Device 104. The use of the First System 114 to further verify that the User 102 is authenticated further enhances the certificate providing process. The use of the database 142 provides additional advantageous variations in embodiments.

Figure 2:
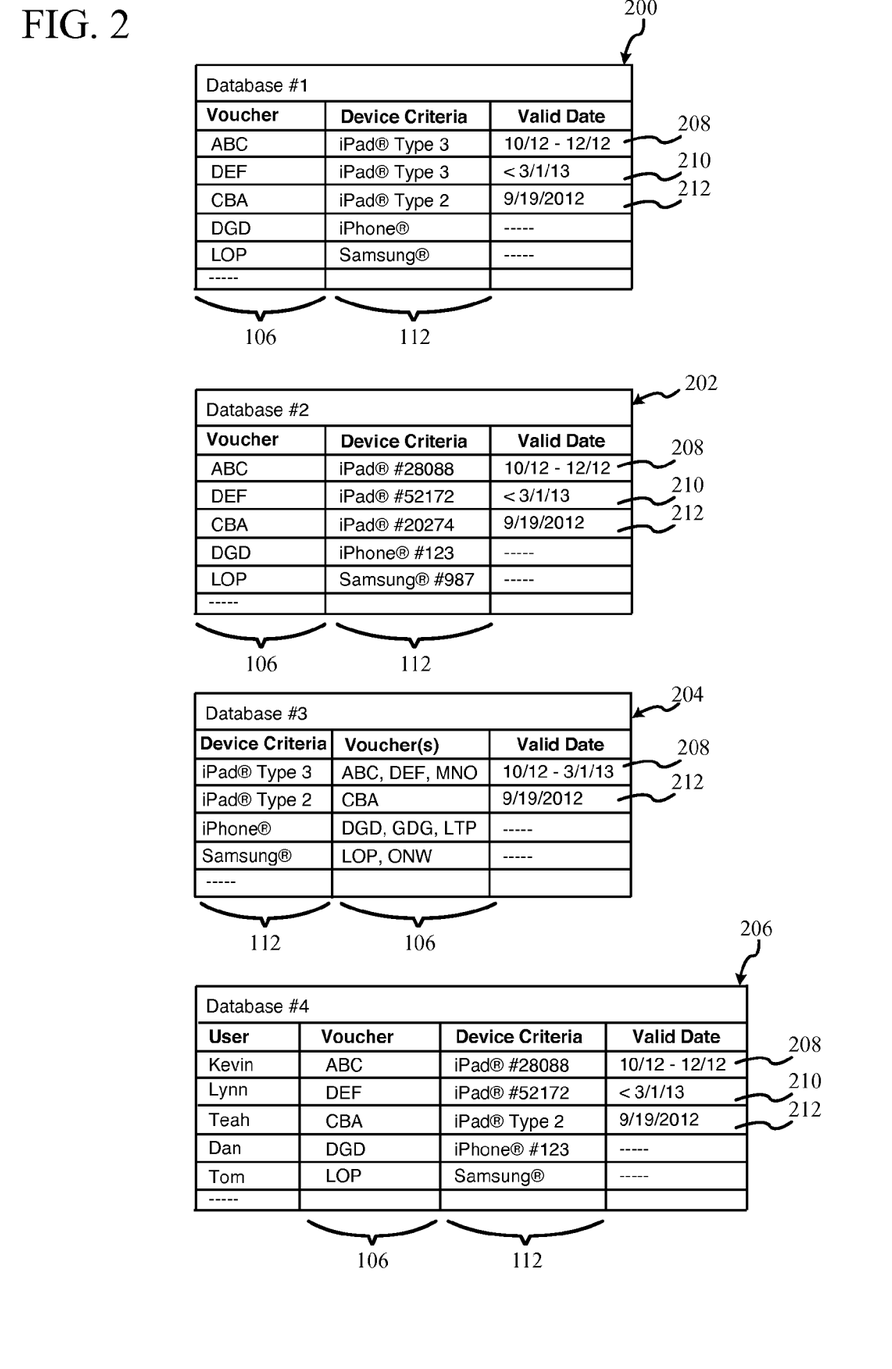
FIG. 2 illustrates conceptual databases as may be used by the system in FIG. 1 in accordance with at least one embodiment.

For example, exemplary variations of four databases 200, 202, 204 and 206 are shown in FIG. 2. As may be appreciated with databases 200, 202, 204 and 206, Vouchers 106 may be specified as being valid for a particular period of time, such as a range of dates 208, before a specific date 210, or perhaps a specific date 212. In some cases it may be desired to have Vouchers that also do not have expiration.

In the first database 200, the vouchers are shown to be correlated to types of First Devices 104. Moreover, in database 200 each voucher is unique and intended for one time use. In the second database 202, not only is each voucher shown to be unique, but each voucher is tied to a specific First Device 104 rather than merely a type of First Device 104.

In the third database 204, different types of First Devices 104 are shown associated with one or more Vouchers 106. These Vouchers 106 may again be one time use vouchers, or in alternative embodiments they may be intended for multiple use and distribution. Moreover, databases 200, 202 and 204 all present different, and certainly not exclusive, options by which both a Voucher 106 and a First Device 104 may be correlated together.

In the fourth database 206, multiple combinations of relating Vouchers 106 and First Devices 104 are shown again. In addition, in database 206 a user characteristic has also been added, such as for example the Users 102 name. Of course additional and/or alternative user characteristics may also be used, such as but not limited to the user's membership in a group, user ID number, user birth date, a security question, or other element sufficient to generally or specifically identify users in varying embodiments.

Moreover, with respect to FIG. 1, it is appreciated that User 102A has a valid Voucher 106A and a corresponding First Device 104A having at least one Characteristic 110A corresponding to a predefined Device Criteria 112 and has been provided with a Certificate 108' for network access upon the Second System 116, this network access illustrated by dotted line 144. Likewise User 102E has a valid Voucher 106E and a corresponding First Device 104E with at least one Characteristic 110E corresponding to a predefined Device Criteria 112 and been provided with a Certificate 108 for network access upon the Second System 116, this network access illustrated by dotted line 146.

Users 102B, 102C and 102D each are unable to receive a Certificate 108 and therefore are shown to have no network access to Second System 116, this lack of access shown by dotted lines 148 with an imposed X.

The multiplicity of elements involved, i.e. a Voucher 106 and a First Device 104 with a corresponding Characteristic 110, can be further appreciated in briefly reviewing exemplary cases of failure to obtain a Certificate 108 as demonstrated by Users 102B, 102C and 102D. In the case of User 102B, User 102B has mistakenly used their proper Voucher 106B with an improper device, i.e., their Second Device 124B which has a different Characteristic 110B and fails to correspond to the at least one predefined device criteria.

In the case of User 102C, User 102C has a proper First Device 104C with at least one Characteristic 110C corresponding to at least one predefined Device Criteria 112, however User 102C has an invalid Voucher 106.

In the case of User 102D, User 102D has a proper First Device 104D, but has also been provided with the same Voucher 106 as used by user 102A, i.e., Voucher 106A. Although User 102D therefore has both a proper First Device 104 having at least one Characteristic 110 corresponding to at least one predefined Device Criteria 112, and what would appear to be a valid Voucher 102A, this particular First Device 104D and Voucher 106A are not intended for use by User 102D, and therefore no Certificate 108 has been provided.

Moreover, SPC 100 may be summarized for at least one embodiment to include a First System 114 structured and arranged as a single sign on system having a plurality of User 102 accounts. SPC 100 also includes an Authorizing System 118 structured and arranged to receive from a User 102 of the First System 114 a request made with a First Device 104 for network access. The request including a Voucher 106. The Authorizing System 118 is further structured and arranged to determine at least one Characteristic 110 of the First Device 104. Upon verification of the Voucher 106 and in response to the First Device 104 having at least one Characteristic 110 corresponding to at least one predefined Device Criteria 112, the User 102 is provided with a Certificate 108 with at least one characteristic for network access.

Figure 3:
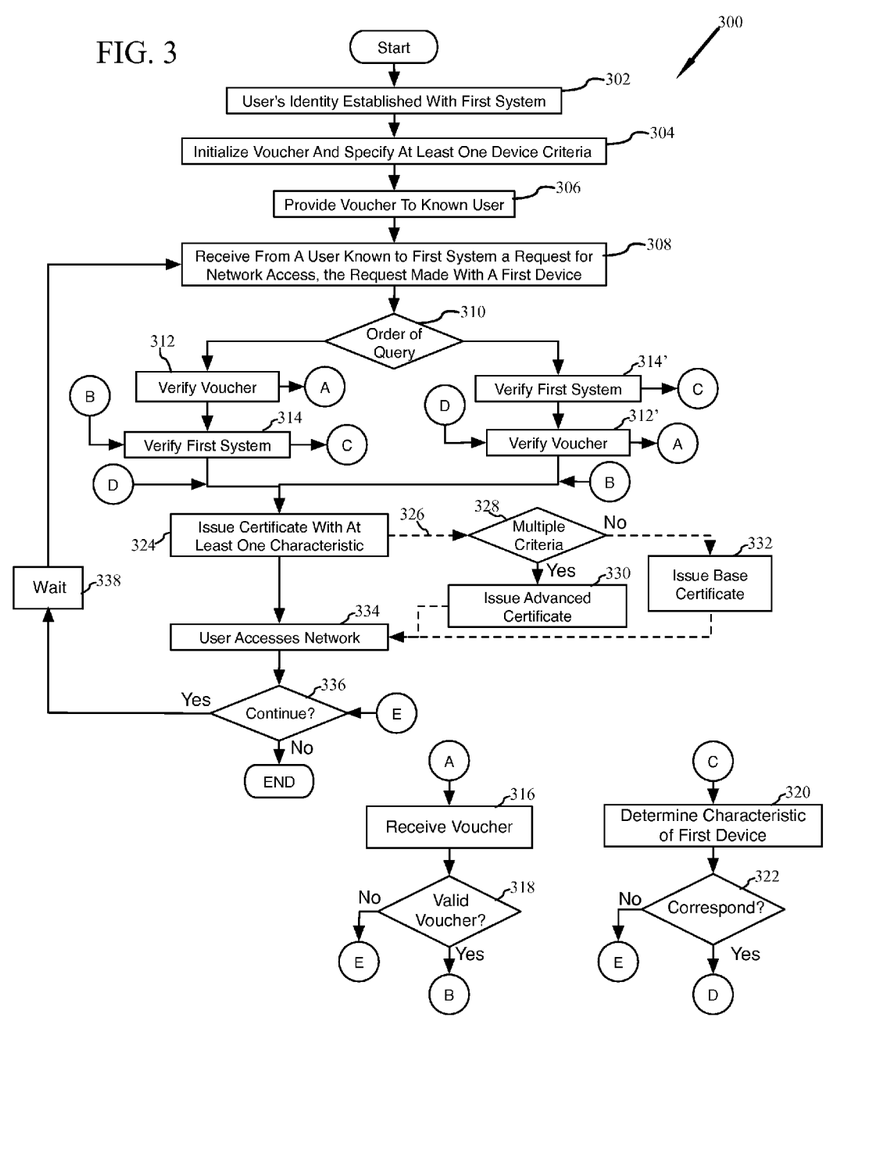
FIG. 3 is a high level flow diagram for a method of providing a certificate for network access to users having a first device having at least one characteristic corresponding to a predefined device criteria and a voucher in accordance with at least one embodiment.

Having described embodiments for SPC 100 as shown with respect to FIGS. 1 and 2, other embodiments related to varying methods of providing a Certificate 108, and more specifically providing a Certificate 108 for network access upon a Second System 116 will now be discussed with respect to FIG. 3, in connection with FIGS. 1 and 2. It will be appreciated that the described method need not be performed in the order in which it is herein described, but that this description is merely exemplary of one method of providing a certificate.

In general, method 300 commences with a User 102 establishing an identity with a First System 114, block 302. As noted above, for at least one embodiment, First System 114 is a name and password system such as are common within corporate or business entities for establishing and verifying employee identities. For at least one alternative embodiment, First System 114 is a social network system or other generally public system which also uses a name and password to verify identity. Of course, in yet further alternative embodiments, verification of identity to the First System 114 may be accomplished by other means beyond username and password, such as secure ID, personal captcha challenge, personal question and answer session, or other appropriate verification means.

Method 300 also includes the initialization of one or more Vouchers 106 and the specification of at least one Device Criteria 112, block 304. A Voucher 106 is then provided to a potential User 102, block 306. For at least one embodiment, a First Device 104 is also provided to the User 102, and potentially by separate delivery means so as to frustrate an improper attempt to use a Voucher 106 and a First Device 104 by other than the intended User 102. For at least one alternative embodiment, the User 102 may be instructed as to the type of First Device he or she should acquire, i.e., the current iPad®, or instructed as to how to obtain a software package that will provide a specified type of First Device 104 with a Characteristic 110.

Through whichever combination of events was deemed most appropriate, it is now assumed that a user, such as User 102A has both a First Device 104A and a Voucher 106A. User 102A now initiates a request for a Certificate 108. Moreover, SPC 100 receives from User 102A, who is known to the First System 114, a request for network access, this request being made by User 102A with the First Device 104A, block 308.

There are at least options for how method 300 may proceed, i.e., verify the Voucher 106 and then verify the First Device 104, or verify the First Device 104 and then verify the Voucher 106. The order of validation may be important in a variety of different situations. For example, where Vouchers 106 are one time use voucher, verifying the Voucher 106 prior to verifying the First Device, could invalidate the Voucher 106 if the wrong device has been used, e.g. a Second Device 124. Simply restarting the process with the correct First Device would then also fail as the one time use Voucher 106 would already be seen as redeemed.

For the embodiment of method 300 as shown, a query is performed to determine which order of verification is preferred, decision 310. For the first option, the order is to verify the Voucher, block 312 and then upon confirmation verifying the First Device, block 314. To verify the Voucher 106, for at least one embodiment, method 300 proceeds by receiving the Voucher 106, block 316. Moreover, in varying embodiments, the Voucher 106 may be received as part of the initial request, or received in response to a request to now provide the Voucher 106.

A query is then performed to determine the validity of the Voucher 106, decision 318. For at least one embodiment, as suggested in the first database 200 shown in FIG. 2 for the sake of example Voucher 106A is shown to be "ABC" and is valid for the date range of October 2012 through December 2012, which at the time of this writing was a valid date range. Method 300 therefore proceeds to verify the First Device 104, block 314.

To verify the First Device 104, method 300 proceeds to determine at least one Characteristic 110A of the First Device 104A, block 320. For the sake of this example, it is assumed that the Characteristic 110A is identification of the First Device 104A as an iPad® Type 3. A query is then made to see if the determined Characteristic 110A corresponds to at least one predefined Device Criteria 112. For this example, that criteria is shown in database 200 to be identification as an iPad® Type 3.

With both the Voucher 106A and the First Device 104A verified, the method 300 proceeds to issue User 102A a certificate having at least one characteristic, block 324. As noted above, optionally method 300 permits Certificates 108 to be issued for different Users 102 having different access privileges. For the present example this is based on User 102A being a manager. When optional path 326 is engaged by method 300 a query is made for multiple criteria, such as not only the Characteristic 110A, but also the identity of the user as Kevin, shown in forth database 206. Of course the additional criteria can in varying embodiments be additional Characteristics 110. As Kevin is recognized as User 102A, he is issued an advanced Certificate 108', block 330. Had additional criteria not been determined User 102A would have been issued a base Certificate 108.

For at least one embodiment each Certificate 108 provided to each User 102 has at least one characteristic. For at least one embodiment, these characteristics are selected from the group consisting of, but not exclusively limited to, root certificate authority, intermediate certificate authority, time period, common name, subject name, and/or subject's alternative name. In other words, each Certificate 108 may have embedded information regarding the Root Certificate Authority or Intermediate Authority who actually issued the Certificate 108, the time period that the Certificate 108 is viable for use—e.g., valid from Jan. 19, 2012 until Sep. 19, 2012, the User's name (Jon Smith), and/or the User's alternative name (Spiff28). For at least one embodiment the issued Certificates 108 are X.509 digital certificates.

Having received a Certificate 108, the User 102 is then permitted to access the Second System, block 334. A query is then performed as to whether or not to continue, decision 336, and in the affirmative, method 300 waits for a new request, block 338, and then returns to block 308.

As noted above, the method 300 can also act to verify the First Device 104 first, block 314', and then upon confirmation of the First Device 104 having at least one Characteristic 110 corresponding to the predefined Device Criteria 112, proceeds to verify the Voucher 106, block 312'.

In the event that either the Voucher 106 is not valid, or the First Device 104 does not have a Characteristic corresponding to at least one predefined Device Criteria 112, then for method 300 as shown no Certificate is issued. For at least one optional embodiment, if the User 102 has either a Valid Certificate or a First Device with at least one Characteristic corresponding to a predetermined Device Criteria 112, but not both—a certificate may be issued with a reduced set of privileges.

Moreover, for at least one embodiment method 300 may be summarized as receiving from a User 102 authenticated to a First System 114 a request made with a First Device 104 for network access, the request including a voucher 106. The method 300 continues with determining at least one Characteristic 110 of the First Device 104, and upon verification of the Voucher 106 and in response to the First Device 104 having at least one Characteristic 110 corresponding to at least one predefined Device Criteria 112, providing the User 102 with a Certificate 108 with at least one characteristic for network access.

With respect to the above method 300 should also be noted that for at least one embodiment, verification of the First Device 104 and the Voucher 106 are performed before user is confirmed as authenticated with the First System 114. As the Certificate 108 has at least one characteristic, it should be understood and appreciated that an issued Certificate 108 can be nullified. As such, in varying embodiments it may be advantageous to permit issue of a Certificate 108 based on validation of the First Device 104 and Voucher, prior to verification of authentication of the User with the First System 114.

In addition with respect to the above discussions, it is understood and appreciated that the Certificates 108 provided to Users 102, may be adapted for use other than or in addition to network access. Moreover, the methods and systems presented herein are indeed adapted and intended for use in providing Certificates 108 for Network Access upon one or more Second Systems 116. But it is understood and appreciated that the teachings for how such Certificates 108 are provided are indeed applicable to other settings where Certificates 108 are desired by one or more Second Systems 116 for applications that may or may not involve network access.

Moreover, embodiments of SPC 100 and method 300 permit advantageous control of Certificates and how they are used. An authorized User 102 may certainly receive a Certificate for access that is viable for his or her company system (e.g., the Users First System 106), but can not transfer this Certificate to his or personal computer, tablet, phone or other non-company system (e.g., the Users Second System 124).

Figure 4:
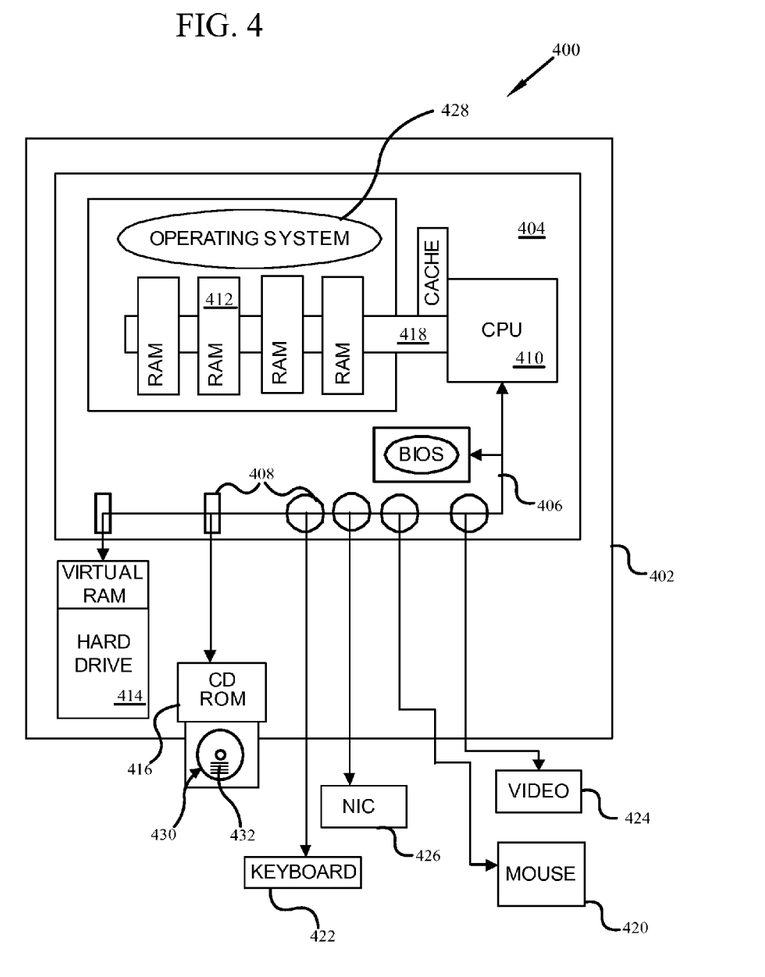
FIG. 4 is a high level block diagram of a computer system in accordance with at least one embodiment.

With respect to the above description of the system and method for providing a Certificate 108, it is understood and appreciated that the method may be rendered in a variety of different forms of code and instruction as may be used for different computer systems and environments. To expand upon the initial suggestion of the First System 114, Second System 116 and Authorizing System 118 being computer systems adapted to their specific roles as well as the First Devices 106 and Second Devices 124 being computing devices, FIG. 4 is a high level block diagram of an exemplary computer system 400 such as may be provided for one or more of the elements comprising the First System 114, Second System 116, Authorizing System 118, a First Device 106 and/or a Second Device 124.

Computer system 400 has a case 402, enclosing a main board 404. The main board 404 has a system bus 406, connection ports 408, a processing unit, such as Central Processing Unit (CPU) 410 with at least one microprocessor (not shown) and a memory storage device, such as main memory 412, hard drive 414 and CD/DVD ROM drive 416.

Memory bus 418 couples main memory 412 to the CPU 410. A system bus 406 couples the hard disc drive 414, CD/DVD ROM drive 416 and connection ports 408 to the CPU 410. Multiple input devices may be provided, such as, for example, a mouse 420 and keyboard 422. Multiple output devices may also be provided, such as, for example, a video monitor 424 and a printer (not shown). As computer system 400 is intended to be interconnected with other computer systems in the SPC 100 a combined input/output device such as at least one network interface card, or NIC 426 is also provided.

Computer system 400 may be a commercially available system, such as a desktop workstation unit provided by IBM, Dell Computers, Gateway, Apple, or other computer system provider. Computer system 400 may also be a networked computer system, wherein memory storage components such as hard drive 414, additional CPUs 410 and output devices such as printers are provided by physically separate computer systems commonly connected together in the network. Those skilled in the art will understand and appreciate that the physical composition of components and component interconnections are comprised by the computer system 400, and select a computer system 400 suitable for one or more of the computer systems incorporated in the formation and operation of MTDC 100.

When computer system 400 is activated, preferably an operating system 426 will load into main memory 412 as part of the boot strap startup sequence and ready the computer system 400 for operation. At the simplest level, and in the most general sense, the tasks of an operating system fall into specific categories, such as, process management, device management (including application and user interface management) and memory management, for example. The form of the computer-readable medium 428 and language of the program 430 are understood to be appropriate for and functionally cooperate with the computer system 400.

Moreover, variations of computer system 400 may be adapted to provide the physical elements of one or more components comprising each First Device 104, Second Device 124, First System 114, Second System 116, Authorizing System 118 the switches, routers and such other components as may be desired and appropriate for the methods and systems of providing a Certificate 108 for network access.

Changes may be made in the above methods, systems and structures without departing from the scope hereof. It should thus be noted that the matter contained in the above description and/or shown in the accompanying drawings should be interpreted as illustrative and not in a limiting sense. Indeed many other embodiments are feasible and possible, as will be evident to one of ordinary skill in the art. The claims that follow are not limited by or to the embodiments discussed herein, but are limited solely by their terms and the Doctrine of Equivalents.

What is claimed:

1. A method of providing a certificate for certificate based wireless access comprising:
    receiving from a wireless first device having at least one processor a user request for certificate based network access, the request including a voucher previously provided by a third party;
    determining at least one characteristic of the first device; and
    upon verification of both the voucher and the first wireless device having at least one characteristic corresponding to at least one predefined device criteria, providing the user with a certificate with at least one characteristic for certificate based authentication upon a second secured wireless network to permit wireless network access by the first device.

2. The method of claim 1, wherein the voucher is valid for one use.

3. The method of claim 1, wherein the voucher is valid within a predefined date range.

4. The method of claim 1, wherein the voucher is verified before the at least one characteristic of the first device.

5. The method of claim 1, wherein the at least one characteristic of the first device must correspond to the at least one predefined criteria before the voucher is verified.

6. The method of claim 1, wherein the third party is the second system.

7. The method of claim 1, wherein the user is an authenticated user.

8. The method of claim 7, wherein the user is authenticated with at least a name and password.

9. The method of claim 7, wherein the user is authenticated by a first system.

10. The method of claim 1, wherein the at least one device criteria is selected from the group consisting of hardware ID, manufacturer, type of device, browser User Agent String, a digital signature.

11. The method of claim 1, wherein determining at least one characteristic of the first device is performed by reviewing metadata provided in the request.

12. The method of claim 1, wherein determining at least one characteristic of the first device is performed by querying the first device.

13. The method of claim 1, wherein determining at least one characteristic of the first device further includes comparing data from the user to a database mapping first devices intended for use by authorized persons.

14. A method of providing a certificate for certificate based wireless network access comprising:
    initializing a voucher and specifying at least one device criteria for receiving a certificate;
    providing the voucher to a user, wherein the voucher is provided by a third party;
    receiving from a first device having at least one processor a user request for certificate based network access;
    determining at least one characteristic of the first device; and
    in response to the first device having a characteristic corresponding to the specified device criteria, permitting the user to provide the voucher, and upon verification of the voucher providing the user with a certificate with at least one characteristic for certificate based authentication upon a second secured wireless network to permit wireless network access by the first device.

15. The method of claim 14, wherein the voucher is valid for one use.

16. The method of claim 14, wherein the voucher is valid within a predefined date range.

17. The method of claim 14, wherein the at least one device criteria is selected from the group consisting of hardware ID, manufacturer, type of device, browser User Agent String, a digital signature.

18. The method of claim 14, wherein the at least one device criteria is use of a previously identified first device for making the network access request.

19. The method of claim 14, wherein at least one device criteria is use of a first device having a known unique ID.

20. The method of claim 14, wherein determining at least one characteristic of the first device is performed by reviewing metadata in the request.

21. The method of claim 14, wherein determining at least one characteristic of the first device is performed by querying the first device.

22. The method of claim 14, wherein determining at least one characteristic of the first device further includes comparing data from the user to a database mapping first devices intended for use by authorized persons.

23. The method of claim 14, wherein the user is an authenticated user.

24. The method of claim 23, wherein the user is authenticated with at least a name and password.

25. The method of claim 23, wherein the user is authenticated by a first system.

26. The method of claim 25, wherein the authentication by the first system is performed after the user has the certificate.

27. A non-transitory machine readable medium on which is stored a computer program for providing a certificate for certificate based network access, the computer program comprising instructions which when executed by a computer system having at least one processor performs the steps of:

receiving from a wireless first device having at least one processor a user request for certificate based network access, the request including a voucher previously provided by a third party;

determining at least one characteristic of the first device; and upon verification of both the voucher and the first wireless device having at least one characteristic corresponding to at least one predefined device criteria, providing the user with a certificate with at least one characteristic for certificate based authentication upon a second secured wireless network to permit wireless network access by the first device.

28. The non-transitory machine readable medium of claim 27, wherein the user is an authenticated user.

29. The non-transitory machine readable medium of claim 27, wherein the user is authenticated with at least a name and password.

30. The non-transitory machine readable medium of claim 27, wherein the user is authenticated by a first system.

31. The non-transitory machine readable medium of claim 27, wherein the voucher is valid for one use.

32. The non-transitory machine readable medium of claim 27, wherein the voucher is valid within a predefined date range.

33. The non-transitory machine readable medium of claim 27, wherein the voucher is verified before the at least one characteristic of the first device.

34. The non-transitory machine readable medium of claim 27, wherein the at least one characteristic of the first device must correspond to the at least one predefined criteria before the voucher is verified.

35. The non-transitory machine readable medium of claim 27, wherein the third party is the second system.

36. The non-transitory machine readable medium of claim 27, wherein the at least one device criteria is selected from the group consisting of hardware ID, manufacturer, type of device, browser User Agent String, a digital signature.

37. The non-transitory machine readable medium of claim 27, wherein determining at least one characteristic of the first device is performed by reviewing metadata provided in the request.

38. The non-transitory machine readable medium of claim 27, wherein determining at least one characteristic of the first device is performed by querying the first device.

39. The non-transitory machine readable medium of claim 27, wherein determining at least one characteristic of the first device further includes comparing data from the user to a database mapping first devices intended for use by authorized persons.

40. A non-transitory machine readable medium on which is stored a computer program comprising instructions to adapt a computer system having at least one processor to provide a certificate for certificate based wireless network access, the computer program comprising:

an input routine operatively associated with an input device for receiving from a first wireless device having a processor a user request for certificate based network access, the request including a voucher provided by a third party;

a verifying routine for verifying at least one characteristic of the first device as corresponding to at least one predefined device criteria and verifying the voucher; and an output routine for providing the user with a certificate with at least one characteristic in response to both verification of the voucher and verification of the first device having at least one device criteria, the certificate permitting wireless network access upon a second secured wireless network by the first device.

41. The non-transitory machine readable medium of claim 40, wherein the voucher is valid for one use.

42. The non-transitory machine readable medium of claim 40, wherein the voucher is valid within a predefined date range.

43. The non-transitory machine readable medium of claim 40, wherein the voucher is verified before the at least one characteristic of the first device.

44. The non-transitory machine readable medium of claim 40, wherein the at least one characteristic of the first device must correspond to the at least one predefined criteria before the voucher is verified.

45. The non-transitory machine readable medium of claim 40, wherein the at least one device criteria is selected from the group consisting of hardware ID, manufacturer, type of device, browser User Agent String, a digital signature.

46. The non-transitory machine readable medium of claim 40, wherein determining at least one characteristic of the first device is performed by reviewing metadata provided in the request.

47. The non-transitory machine readable medium of claim 40, wherein determining at least one characteristic of the first device is performed by querying the first device.

48. The non-transitory machine readable medium of claim 40, wherein determining at least one characteristic of the first device further includes comparing data from the user to a database mapping first devices intended for use by authorized persons.

49. The non-transitory machine readable medium of claim 40, wherein the user is authenticated to a first system.

50. The non-transitory machine readable medium of claim 40, wherein the third party is the second system.

51. A system for providing a certificate for certificate based wireless network access comprising:

a first system having at least one microprocessor and adapted as a single sign on system having a plurality of user accounts;

an authorizing system having at least one microprocessor and adapted to receive from a user of the first system a request made with a first device for certificate based network access, the request including a voucher provided by a third party, the authorizing system further adapted to determine at least one characteristic of the first device and upon verification of both the voucher and the first device having at least one characteristic corresponding to at least one predefined device criteria, providing the user with a certificate with at least one characteristic for certificate based authentication to permit wireless network access upon a second secured wireless network by the first device.

52. The system of claim 51, wherein the voucher is valid for one use.

53. The system of claim 51, wherein the voucher is valid within a predefined date range.

54. The system of claim 51, wherein the voucher is verified before the at least one characteristic of the first device.

55. The system of claim 51, wherein the at least one characteristic of the first device must correspond to the at least one predefined criteria before the voucher is verified.

56. The system of claim 51, wherein the third party is the second system.

57. The system of claim 51, wherein the at least one device criteria is selected from the group consisting of hardware ID, manufacturer, type of device, browser User Agent String, a digital signature.

58. The system of claim 51, wherein determining at least one characteristic of the first device is performed by reviewing metadata provided in the request.

59. The system of claim 51, wherein determining at least one characteristic of the first device is performed by querying the first device.

60. The system of claim 51, wherein the user is authenticated with at least a name and password by the first system.

\* \* \* \* \*